United States Patent [19]

Edakubo et al.

[11] Patent Number: 4,870,510
[45] Date of Patent: Sep. 26, 1989

[54] VIDEO SIGNAL REPRODUCING APPARATUS USING MEMORY

[75] Inventors: Hiroo Edakubo; Chikara Sato, both of Kanagawa; Susumu Kozuki, Tokyo; Katsuji Yoshimura, Kanagawa, all of Japan

[73] Assignee: Canon Kabushiki Kaisha, Tokyo, Japan

[21] Appl. No.: 58,326

[22] Filed: Jun. 4, 1987

[30] Foreign Application Priority Data

| Jun. 23, 1986 | [JP] | Japan | 61-144922 |
| Jun. 23, 1986 | [JP] | Japan | 61-144923 |
| Jul. 2, 1986 | [JP] | Japan | 61-154132 |
| Jul. 10, 1986 | [JP] | Japan | 61-160838 |

[51] Int. Cl.$^4$ ............................................. H04N 5/782
[52] U.S. Cl. ..................................... 360/27; 360/10.3; 358/312
[58] Field of Search ............... 358/312, 326, 323, 321; 360/10.1, 10.2, 10.3, 19.1, 27, 36.2

[56] References Cited

U.S. PATENT DOCUMENTS

| 4,139,867 | 2/1979 | Foerster | 360/10.3 |
| 4,161,001 | 7/1979 | Sakamoto | 360/10.3 |
| 4,210,938 | 7/1980 | Heitmann et al. | 360/10.3 |
| 4,280,147 | 7/1981 | Baldwin | 360/10.3 |
| 4,293,879 | 10/1981 | Heitmann et al. | 360/10.3 |
| 4,389,678 | 6/1983 | Mizukami et al. | 360/10.3 |
| 4,392,162 | 7/1983 | Yamamoto | 360/10.3 |
| 4,403,260 | 9/1983 | Kawamura et al. | 360/10.3 |
| 4,445,145 | 4/1984 | Moriya | 360/10.3 |
| 4,463,390 | 7/1984 | Koga et al. | 360/10.3 |
| 4,470,079 | 9/1984 | Tsuruta | 360/10.3 |
| 4,558,376 | 12/1985 | Heitmann | 360/10.3 |
| 4,558,378 | 12/1985 | Shibata et al. | 360/19.1 |
| 4,597,020 | 6/1986 | Wilkinson | 360/10.3 |
| 4,635,134 | 1/1987 | Sasamura et al. | 360/10.3 |
| 4,644,414 | 2/1987 | Yamada et al. | 360/10.3 |
| 4,644,415 | 2/1987 | Serizawa et al. | 360/10.3 |

Primary Examiner—Donald McElheny, Jr.
Attorney, Agent, or Firm—Robin, Blecker, Daley & Driscoll

[57] ABSTRACT

In a video signal reproducing apparatus of the kind reproducing a video signal from a record bearing medium on which a predetermined period portion of the video signal is recorded together with a pilot signal in each of many recording tracks formed in parallel with each other: a tracking error signal is generated on the basis of pilot signals reproduced by a reproducing head; and each of the predetermined period portions of the video signal reproduced by the reproducing head is determined to be or not to be stored at a memory which is capable of storing the portion of said video signal covering a predetermined period of time.

9 Claims, 12 Drawing Sheets

FIG.8(a) TRACING LOCUS OF HEAD

VIDEO SIGNAL REPRODUCING APPARATUS USING MEMORY

BACKGROUND OF THE INVENTION

1. Field of the Invention

This invention relates to a video signal reproducing apparatus and more particularly to a video signal reproducing apparatus having a memory device which is capable of storing a portion of the video signal covering a predetermined period of time.

2. Description of the Related Art

Figure 1:
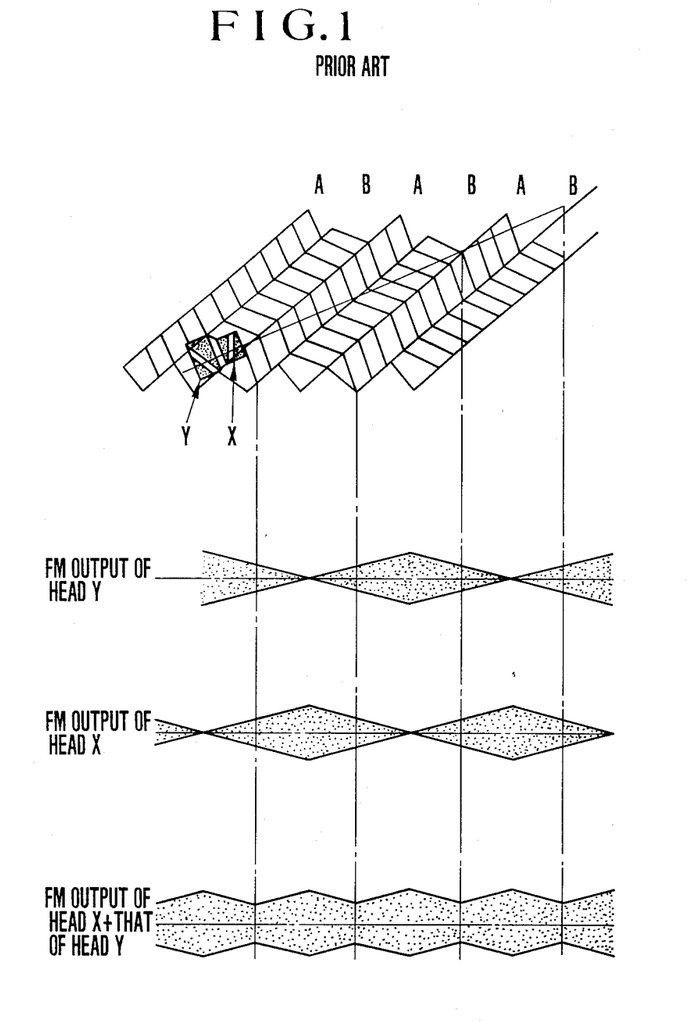
FIG. 1 is an illustration of the position of the reproducing heads of an example of the conventional VTR in relation to recording tracks formed on a record bearing medium and the reproduction output of the heads.

FIG. 1 of the accompanying drawings shows the heads of the conventional video tape recorder (hereinafter referred to as VTR) which is a reproducing apparatus of the above stated kind as in relation to recording tracks formed on a record bearing medium and also shows the reproduction outputs of the heads.

The conventional method for improving picture quality during the so-called special reproduction and particularly during a high speed reproducing search made for a video signal to be reproduced by allowing the tape to travel at a high speed has been as follows: Referring to FIG. 1, two heads of different azimuth angles are adjacently arranged as shown in FIG. 1. The output of each of the heads is arranged to be taken out only when the head is tracing a track of the same azimuth angle as the head. The method gives a picture with inconspicuous noise bars. However, in the event of a two-head helical scanning type VTR, this method necessitates use of at least four heads. Besides, in that event, two of these heads must be adjacently arranged. This results in a complex head arrangement. Further, the number of slots of a rotary transmitter increases according as the number of heads increases thus resulting in an increase in the size of the rotary transmitter. In cases where the VTR must use a compact rotary head type drum like in the case of the so-called 8 mm VTR, therefore, the above stated method has been hardly employable.

Further, in an effort to make reproduced images more easily discernible in performing high speed search reproduction with the VTR of the above stated kind arranged to have two heads, it has been practiced to have noise bars appear in a fixed part on the picture plane.

Figures 2A, 2B:
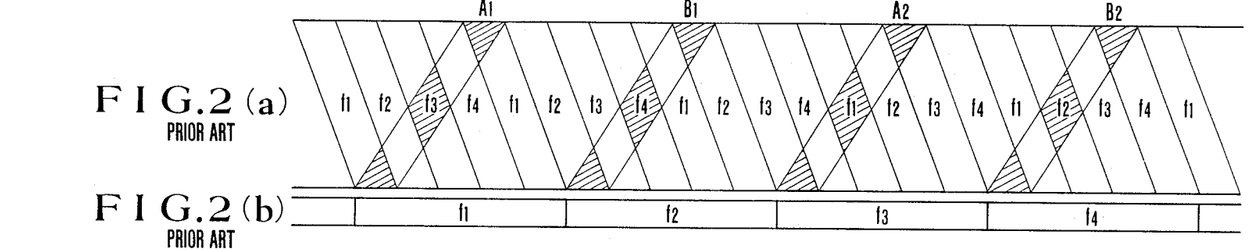
FIGS. 2(a), 2(b), 3(a) and 3(b) show the tracing loci of the reproducing head of the same VTR obtained during high speed search reproduction and the frequencies of reference pilot signals.
Figures 3A, 3B:
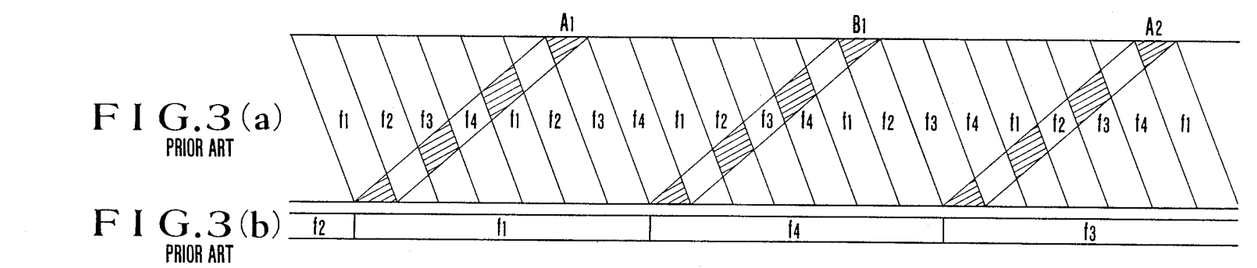

FIGS. 2(a) and 3(a) show a tape which is employed as a record bearing medium and the tracing loci of the heads obtained on the tape under high speed search reproduction performed by the conventional VTR which is arranged to do tracking control in the so-called four frequency method. In these drawings, reference symbols f1, f2, - - - denote pilot signals recorded on the tape. Reference symbols Ai, Bi, - - - (wherein "i" represents one of integers 1, 2, - - - ) denote the tracing loci of the heads A and B which are of different azimuth angles.

(i) High speed search reproduction at a tape travel speed (4m+1) times as high as the tape speed employed for recording is performed as follows: FIG. 2(a) shows the tracing loci of the rotary head obtained on the tape in case that the tape speed is determined with "m" set at m=1. Symbols f1, f2, f3 and f4 denote the frequencies of the pilot signals which are recorded in recording tracks in a superimposed manner. FIG. 2(b) shows the frequencies of reference pilot signals by which reproduced pilot signals are to be multiplied at a tracking control circuit arranged to operate in accordance with the known four-frequency method.

In obtaining a tracking error signal by the known four-frequency method, a frequency component fA (=f2−f1=f3−f4) which is included in a multiplication output obtained from the reproduced pilot signal and the reference pilot signal is compared with a frequency component fa (=f4−f1=f3−f2). The result of comparison is used as the tracking error signal (hereinafter referred to as ATF signal). This error signal represents a tracking error relative to a recording track in which the pilot signal of the same frequency as that of the reference pilot signal is recorded. Therefore, in the case of the high speed search reproduction at a tape speed (4m+1) times as high as the recording tape speed, a track to be controlled appears at intervals of (4m+1) tracks. Accordingly, the frequencies of the reference pilot signals are changed from one over to another by rotation in the order of f1 - f2 - f3 - f4 every time the rotary head traces the tape. The ATF signal which is thus obtained is sampled and held at a given phase of the rotary head. A tracking control signal then can be obtained from this for making the noise bar appearing part unvarying. Further, the tracing loci shown in FIG. 2(a) is obtained by sampling and holding the ATF signal immediately after the rotary head comes to the tape.

(ii) High speed search reproduction at a tape speed (4m+3) times as high as the tape speed employed in recording is performed as follows: FIG. 3(a) shows tracing loci obtained with the tape speed determined by setting "m" at m=1. FIG. 3(b) shows the frequencies of the reference pilot signals. In this instance, the reference pilot signals are arranged to be produced by rotation in the frequency order of f1 - f4 - f3 - f2. Then, in the same manner as in the case of FIG. 2, the noise bar appearing part can be made unvarying by sampling and holding the ATF signal at a given phase of the rotary head. The tracing loci in this instance is also obtained by sampling and holding the ATF signal immediately after the rotary head comes to the tape in the same manner as in the case of FIG. 2(a).

The noise bar appearing part thus can be fixed during the high speed search reproduction in this manner. However, the conventional method is incapable of preventing the disagreeable noise bars from being generated.

The special reproducing operations which are to be accomplished at tape (moving or travel) speed differing from the tape speed employed in recording include, for example, still picture reproduction which is to be made at a tape speed 0 times as high as the recording tape speed and high speed reproduction which is to be made at a tape speed n times (n>1) as high as the recording tape speed and a slow reproduction which is to be made at a tape speed 1/n times as high as the recording tape speed. The VTR of the type having such varied speed reproducing functions has been arranged in varied improving attempts to lessen or make less conspicuous the appearance of noises on a reproduced picture plane resulting from reproduction of the record with the rotary heads straddling more than two tracks of different azimuth angles in tracing them like in the case of the above stated example of the conventional VTR. In addition to these noise suppressing attempts, efforts have been exerted to make improvement also in other points.

One of other points of improvement is as follows: Since a relative speed obtained between the tape and the head during reproduction differs from the relative speed obtained in recording, color deviation, etc. take place to deteriorate the picture quality on the picture plane. The picture quality deterioration must be prevented. Another point of improvement is as follows: Since, in this instance, the tape speed differs from the normal tape speed, the VTR must be arranged to prevent the continuity of a vertical synchronizing signal from being impaired by the straddling timing of the rotary head from one track over to another in reproducing the record. In that instance, one frame portion of the video signal is arranged to be formed with two field portions of the video signal by offsetting the vertical synchronizing signals of odd- and even-number fields.

In attaining the former point of improvement, the number of the rotational frequency of a drum motor which rotates the rotary head is arranged to be variable in such a manner as to have the relative speed which obtains between the head and the tape during the varied speed reproduction approximately coincide with the relative speed obtained in recording. In the case of the latter point of improvement, since the head in general traces the tape by straddling at least two adjacent tracks in the event of variable speed reproduction, the continuity of the vertical synchronizing signal is arranged to be retained by inserting later a dummy vertical synchronizing signal; and, at the same time, offset adjustment is made between the fields. Furthermore, in connection with the former point, the rotational frequency of the rotary head is arranged to be different from the rotational frequency of the rotary head employed in recording or in normal reproduction for the purpose of having the varied speed reproduction performed at the same relative speed between the head and the tape as in recording. The dummy vertical synchronizing signal is then formed on the basis of rotation phase detection pulses representing the rotation phase of the rotary head according to the above stated different rotational frequency.

Meanwhile, a VTR of the type arranged to use a field memory device in the above stated mode of varied speed reproduction has appeared during the recent years. According to the arrangement of this type of VTR, one field portion of a video signal having no noise or not much noise is written as data into this field memory. Then, the written data is continuously read out as necessary. More specifically, the VTR having the field memory has one field portion of a reproduced video signal which gives a sufficiently large reproduction output stored at the memory in the case of, for example, still picture reproduction and then repeatedly read out as an output for the same one field portion of the video signal. Therefore, in that instance, one and the same field portion of the reproduced video signal is repeatedly produced as a reproduced signal. Under this condition, the odd- and even-number fields have the vertical synchronizing signal at the same phase. Therefore, for the even-number field, the phase of the vertical signal must be shifted to an extent corresponding to ½ H (H: horizontal scanning period) by inserting a dummy vertical synchronizing signal.

Figure 4:
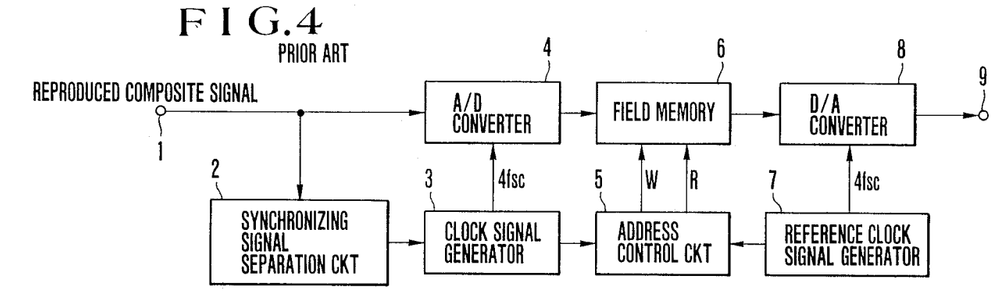
FIG. 4 is a block diagram showing the arrangement of the essential parts of the convention VTR of the type having a field memory.
Figure 5:
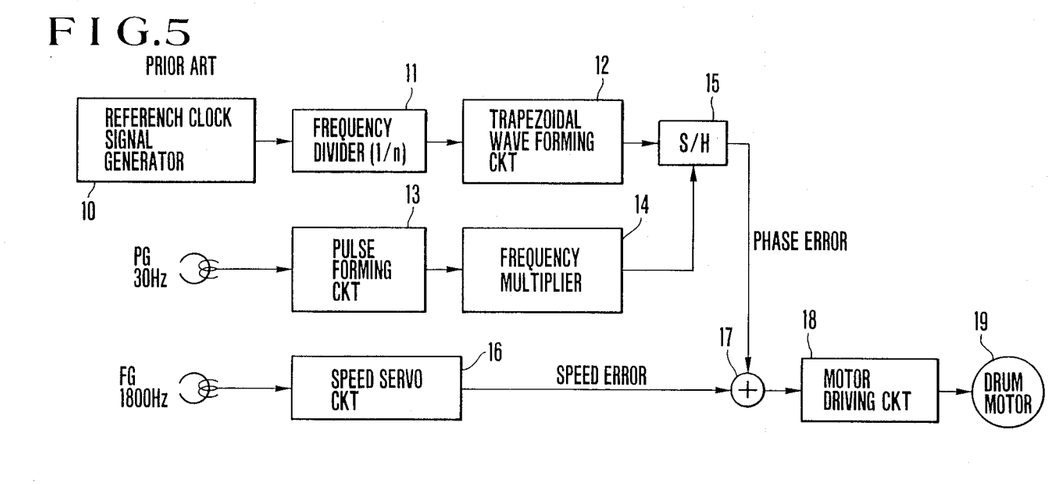
FIG. 5 is a block diagram showing by way of example the arrangement of a rotation servo circuit provided for the rotary heads of the conventional VTR.

FIG. 4 shows in a block diagram the arrangement of the essential parts of the conventional VTR having a field memory device which is arranged to be used at the time of still picture reproduction. FIG. 5 shows in a block diagram the conventional drum servo circuit which is arranged to rotate a rotary head. Referring to FIGS. 4 and 5, a synchronizing signal separation circuit 2 is arranged to separate synchronizing signals from a reproduced video signal which comes via a terminal 1. The VTR comprises a clock signal generator 3; an analog-to-digital (A/D) converter 4; an address control circuit 5; a field memory 6; reference clock signal generators 7 and 10; a digital-to-analog (D/A) converter 8; a frequency divider 11; a trapezoidal wave forming circuit 12; a pulse forming circuit 13; a frequency multiplier 14; a sample and-hold (S/H) circuit 15; a speed servo circuit 16; an adder 17; a motor driving circuit 18; and a motor 19.

Referring to FIG. 4, a reproduced signal produced from a rotary head which is not shown undergoes a known signal processing operation to be converted into a composite television signal. The composite signal is supplied to the input terminal 1. The synchronizing signal separation circuit 2 then separates the synchronizing signal from this composite signal. The clock signal generator 3 is caused to oscillate by the separated signal in synchronism with the latter. The A/D converter 4 samples the composite signal according to the output of the clock signal generator 3 and converts the composite signal into a digital signal. In this instance, the sampling frequency is approximately set at 4 fsc (fsc: the color subcarrier frequency of the chrominance signal). However, in case that the separated synchronizing signal has some time-base error, the sampling frequency varies according to the time base error.

Meanwhile, the output of the clock signal generator 3 is supplied also to the address control circuit 5 for controlling the writing address of the field memory 6. The above stated digital data is stored at the writing addresses of the field memory 6 in sequence as determined by the control circuit 5.

In reading out the stored digital data, reading addresses are controlled by a clock signal produced from the reference clock signal generator 7 which is arranged, for example, to generate clock pulses at the frequency of 4 fsc. The digital data thus read out from the addresses one after another is supplied to the D/A converter 8 which is driven to operate also by the reference clock signal from the generator 7. The D/A converter 8 produces an analog signal which resumes the form of the composite television signal. The composite signal is then produced from an output terminal 9.

Figure 6A:
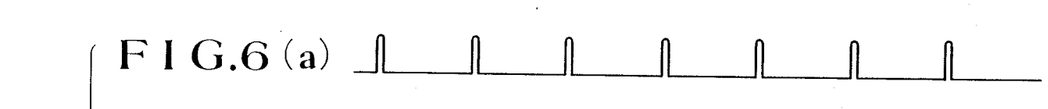
FIGS. 6(a) to 6(d) show in a timing charts the wave forms of the outputs of various parts of the circuit arrangement shown in FIG. 5.
Figures 6B, 6C:
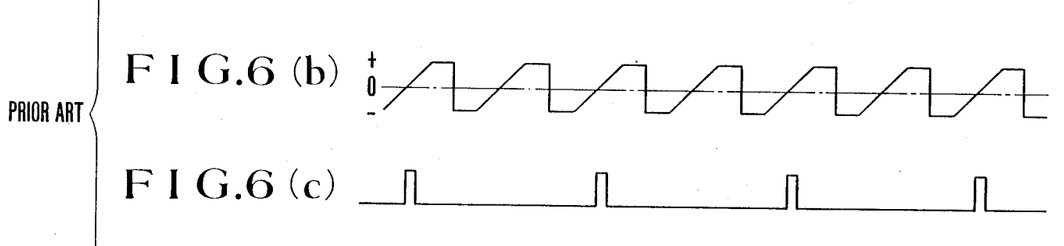
Figure 6D:
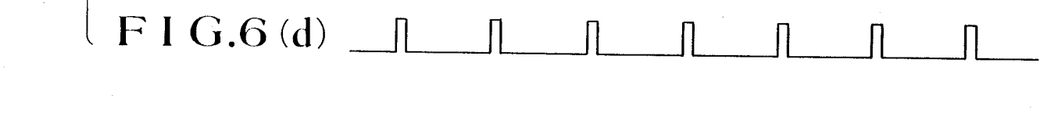

FIGS. 6(a) to 6(d) show in a timing chart the wave forms of the outputs of various parts of the drum servo circuit of FIG. 5. The clock signal of the frequency 4 fsc produced from the reference clock signal generator 10 is frequency divided by the frequency divider 11 which is arranged to perform frequency division of 1/238848. The frequency divider 11 then produces a clock signal of 60 Hz as shown in FIG. 6(a). This clock signal is supplied to the trapezoidal wave forming circuit 12. The circuit 12 then produces an output which is as shown in FIG. 6(b). The S/H circuit 15 samples and holds the output of the circuit 12 in accordance with pulses produced from the frequency multiplier 14. A PG head which is arranged to detect the rotation phase of the drum motor 19 produces a rotation detecting pulse signal (hereinafter referred to as PG pulses). The PG pulses are supplied to the pulse forming circuit 13 to be converted into a pulse signal of 30 Hz as shown in FIG. 6(c). The pulse signal is supplied to the frequency multiplier 14 to have its frequency multiplied by two as shown in FIG. 6(d) and thus becomes sampling pulse signal to be applied to the S/H circuit 15. The output of the S/H circuit 15 serves as a phase error signal. The adder 17 adds this phase error signal and a speed error signal coming from the speed servo circuit 16. The result of addition is applied to the drum motor driving circuit 18. The speed servo circuit 16 is arranged to obtain by a known method the above stated speed error signal representing the frequency speed error of a signal produced from an FG head relative to the rotating speed of the drum motor 19 and to supply it to the adder 17.

In performing varied speed reproduction with the conventional VTR using the field memory, when the rotating speed of the rotary head is changed for the purpose of making the relative speed between the tape and the head the same as the relative speed obtained at the time of recording, the period during which one field portion of the video signal is reproduced by the rotary head does not coincide with a period required for reading out one field portion of the video signal from the field memory. Therefore, the vertical synchronising timing of the signal read out from the field memory deviates from the signal reproduced by the rotary head during the varied speed reproduction. As a result, the reproduced picture is disturbed by the timing deviation. Meanwhile, an attempt to avoid this by adjusting the rotating speed of the rotary head to the head rotating speed employed in recording would result in the color deviation of the reproduced picture as mentioned in the foregoing. Further, the effort to obtain one field portion of a video signal in a relatively good state as mentioned in the foregoing does not much improve the quality of a reproduced picture in the event of, for example, a high speed search reproducing operation or the like, because many tracks are to be traversed by the head while one field portion of the video signal is reproduced in that instance.

SUMMARY OF THE INVENTION

It is a general object of this invention to solve the above stated problems of the prior art.

It is a more specific object of this invention to provide a video signal reproducing apparatus which is capable of giving an adequately reproduced signal even in the event of reproduction to be performed with the reproducing head thereof tracing a record bearing medium in a state of straddling a plurality of tracks thereon.

It is another object of this invention to provide a video signal reproducing apparatus arranged to be capable of ensuring that a highly adequate signal is stored at a memory device by accurately detecting a period of time during which an adequately reproduced signal is obtainable, so that the quality of a reproduced picture can be enhanced.

It is a further object of this invention to provide a video signal reproducing apparatus which is capable of storing only an adequately reproduced signal at a memory without recourse to any additional circuit.

Under this object, a video signal reproducing apparatus arranged as an embodiment of this invention to reproduce a video signal from a record bearing medium on which a predetermined period portion of the video signal is recorded together with a pilot signal in each of many recording tracks formed in parallel comprises: a reproducing head which is arranged to trace the surface of the record bearing medium; memory means which is arranged to receive the video signal reproduced by the reproducing head and to be capable of storing the predetermined period portion of the video signal; tracking error signal generating means for generating a tracking error signal which is indicative of the position of the reproducing head relative to the track on the basis of the pilot signal reproduced by the reproducing head; and writing control means for determining, according to the tracking error signal, whether or not the video signal reproduced by the reproducing head is to be written into the memory means.

It is further object of this invention to provide a video signal reproducing apparatus which is capable of giving an adequately reproduced picture by using memory means without impairing the continuity of a vertical synchronizing signal included in a reproduced video signal.

Under that object, a video signal reproducing apparatus arranged as another embodiment of this invention to reproduce a video signal from a record bearing medium on which a portion of the video signal for a given period of time predetermined in relation to a vertical scanning period is recorded in each of many recording tracks formed in parallel comprises: a reproducing head arranged to trace the surface of the record bearing medium; memory means arranged to receive the video signal reproduced by the reproducing head and to be capable of storing the predetermined period portion of the video signal; address control means for controlling the writing address of the memory means; and address reset means for resetting the writing address on the basis of a vertical synchronizing signal included in the video signal reproduced by the reproducing head.

It is a still further object of this invention to provide a video signal reproducing apparatus which is capable of giving an adequately reproduced picture by using memory means and by preventing the picture quality from deteriorating as a result of a difference of the relative speed of the head thereof and a record bearing medium from their relative speed obtained in recording.

These and other objects and features of the invention will become apparent from the following detailed description of embodiments thereof taken in connection with the accompanying drawings.

DETAILED DESCRIPTION OF PREFERRED EMBODIMENTS

Figure 7:
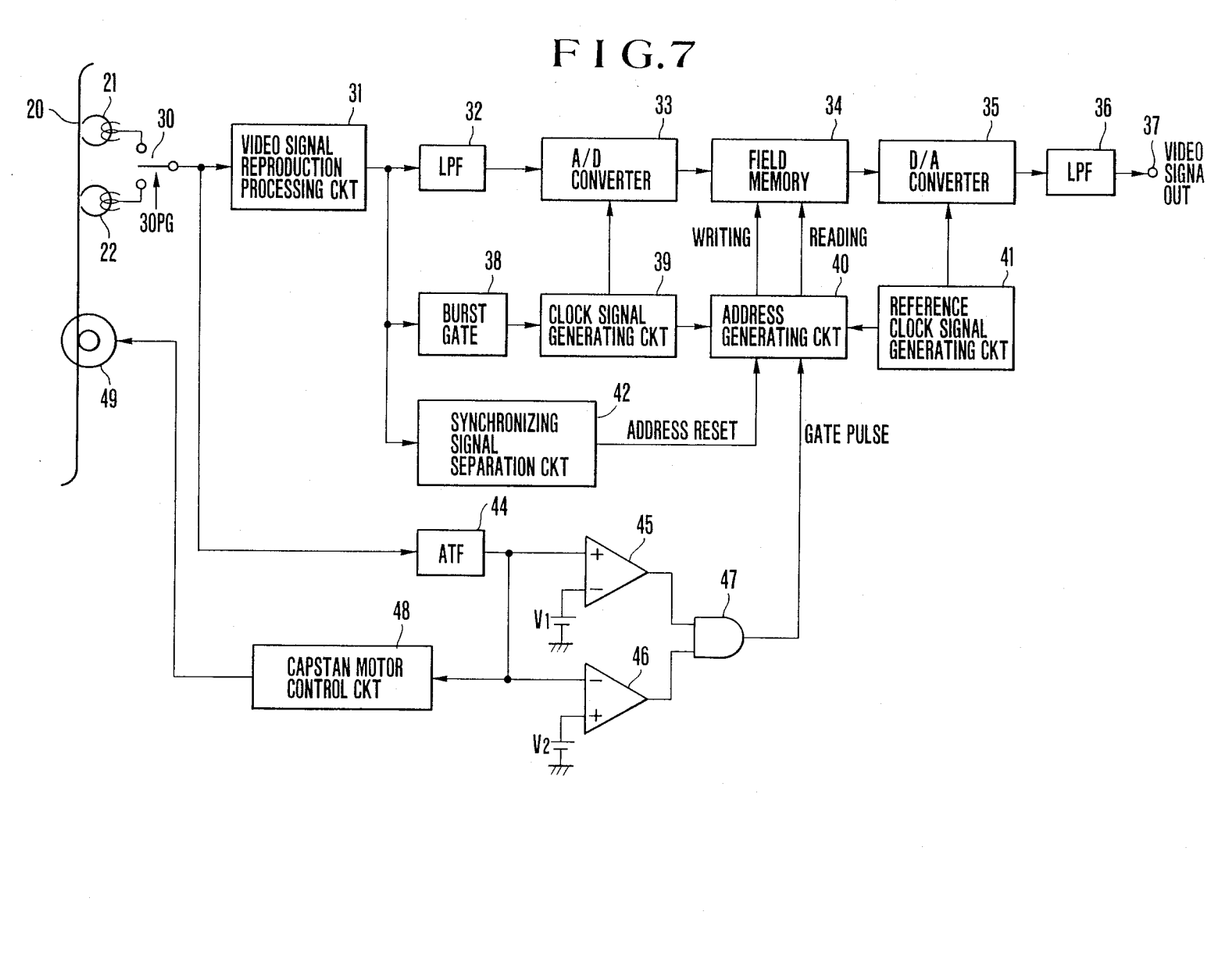
FIG. 7 is a block diagram showing the essential parts of a VTR arranged as an embodiment of this invention.
Figure 8A:
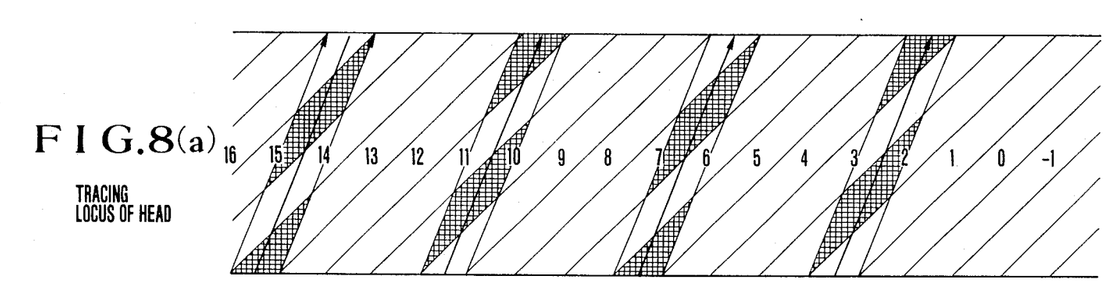
FIGS. 8(a) to 8(e) show in a timing chart the operation of the VTR of FIG. 7.
Figures 8B, 8C, 8D:
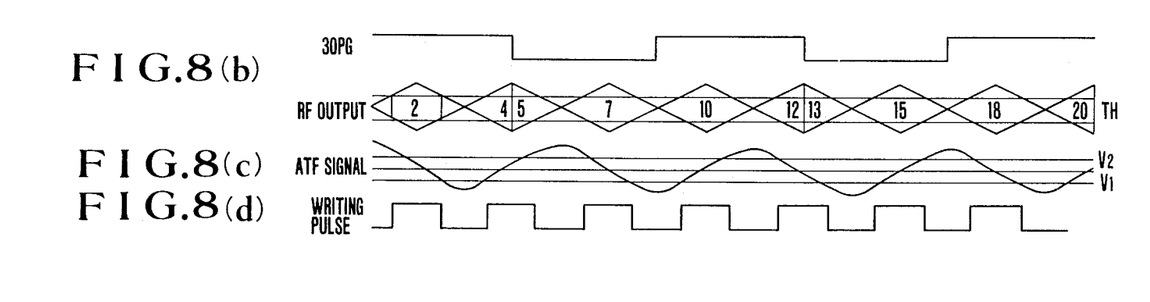
Figure 8E:
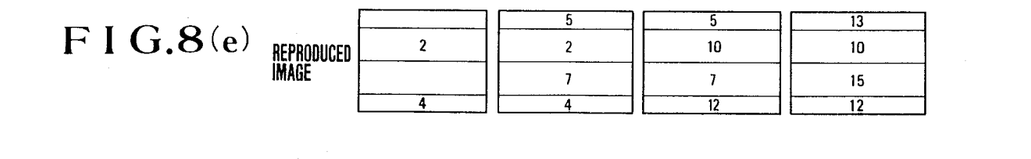

FIG. 7 shows in a block diagram a VTR which is arranged as an embodiment of this invention. FIGS. 8(a) to 8(e) show in a timing chart the operation of the same VTR. Of these drawings, FIG. 8(a) shows the tracing loci of a rotary head obtained on a magnetic tape; FIG. 8(b) shows a signal of 30 Hz synchronized with the rotation of a rotary drum (hereinafter referred to as 30 PG signal) and an RF signal reproduced by the rotary head; FIG. 8(c) shows a tracking error signal obtained by the known four frequency method (hereinafter referred to as ATF signal); FIG. 8(d) shows the wave form of pulses obtained through a window comparator by comparing the ATF signal of FIG. 8(c) with a reference voltage; and FIG. 8(e) shows a reproduced image as stored at a field memory. For the sake of convenience, the above stated head is assumed to be consisting of two head parts each having the same width as that of one video signal recording track.

Referring to FIG. 7, a video signal reproduction processing circuit 31 is arranged to receive video signals which are reproduced by rotary heads 21 and 22 and are alternately supplied via a switch 30 in synchronism with the 30 PG signal and to process them into the form of a composite television signal. A low pass filter (LPF) 32 is arranged to restrict the frequency band of the video signal produced from the circuit 31. The VTR further comprises an analog-to-digital (A/D) converter 33; a field memory 34; a digital-to-analog (D/A) converter 35; an LPF 36; an output terminal 37 from which the video signal is to be produced to the outside; a burst gate 38 which gates a burst signal included in the video signal; a clock signal generating circuit 39 which is arranged to generate a sampling clock pulse signal having the same frequency as that of the subcarrier of a chrominance signal in synchronism with the burst signal; an address generating circuit 40 which is arranged to control the writing address of the field memory 34; a clock signal generating circuit 41 which is arranged to control the timing of reading from the field memory 34; a synchronizing signal separation circuit 42 which is arranged to extract a vertical synchronizing signal from the video signal; an ATF circuit 44 which is arranged to form an ATF signal according to the known four-frequency method; comparators 45 and 46; and an AND circuit 47.

The circuit arrangement of FIG. 7 operates as described below with reference to FIGS. 8(a) to 8(e):

For the sake of simplification, a forward search operation at a tape speed four times as high as a tape speed employed in recording is described by way of example here. The reproduced video signal obtained through the signal processing operation of the video signal reproduction processing circuit 31 is supplied to the LPF 32 which is arranged as a front filter to restrict the frequency band of the video signal. The video signal is then sampled according to the sampling clock signal having the same frequency as the subcarrier which is in synchronism with the reproduced burst signal included in the video signal and is four times as high as the burst signal. After sampling, the video signal is A/D converted by the A/D converter 33. The digital data thus obtained is written into the field memory 34. The timing of writing into the field memory 34 is controlled by the sampling clock signal while the writing position is controlled by address data which is generated by the address generating circuit 40. The circuit 40 generates this address data according as a counter which is arranged to be reset by the vertical synchronizing signal of the reproduced video signal up counts the pulses of the above stated sampling clock signal one by one.

FIG. 8(a) shows the tracing loci of the head obtained when the forward search is made at the tape speed four times as high as the recording tape speed. In this instance, a reproduced RF signal is obtained in a state as shown in FIG. 8(b). While an adequately reproduced picture is obtainable from the high level part of the reproduced RF signal, the absolute value of the level of the ATF signal becomes small at the high output level of the RF signal. The reason for this is as follows:

As well known, the ATF signal is obtained with the reproduction levels of pilot signals which are recorded in adjacent tracks located on both side of a track under tracking control compared with that of the pilot signal of the controlled track. Therefore, the level of the ATF signal becomes low when the head is tracing a track located two tracks before or after the controlled track. Further, since the same pilot signal is recurrently recorded at intervals of four tracks, the AFT signal becomes small when the head is tracing a track located 2n (n: an integer) tracks away from the controlled track. Assuming that the recording tracks are formed by azimuth recording, an adequately reproduced signal is obtainable from a track located 2n tracks away from the controlled track. It is, therefore, possible to find whether the reproduced signal is in an adequately reproduced state or not by the magnitude of the absolute level value of the ATF signal.

Therefore, an adequately reproduced picture can be obtained by rewriting the field memory 34 only with a video signal portion obtained when the absolute level value of the ATF signal is small. Accordingly, the timing of rewriting is selected on the condition that the absolute level value of the ATF signal is within a given value range. More specifically, the ATF circuit 44 obtains the ATF signal from the reproduced signal output. Then, the pair of comparators 45 and 46 which jointly form a window comparator compare the ATF signal with reference voltages V1 and V2 and a logical product is obtained. By this, the level of the ATF signal can be determined as to whether it is between the voltages V1 and V2. As a result of this, a rewriting instruction signal is obtained. The instruction signal is supplied to the address generating circuit 40. In response to the signal, the circuit 40 generates address data according to the above stated timing. The content of the field memory 34 is renewed on the basis of the address data. Stored data is read out from the field memory 34 according to the reference clock signal generated by the clock signal generating circuit 41. The data read out is D/A converted at the A/A converter 35 and then is produced as a video signal from the terminal 37. Meanwhile, the ATF signal is supplied to a capstan motor control circuit 48. Tracking control is then accomplished by controlling the rotation of a capstan 49.

In the VTR described, the content of the field memory is renewed with only a portion of the reproduced video signal that has a sufficient reproduction output level within the video signal reproduced by the head. The VTR is, therefore, capable of giving a reproduction output of good picture quality even in the event of reproduction at a high travel speed of the tape without necessitating an increase in the number of heads.

Further, since the writing address is reset every time the vertical synchronizing signal is reproduced, the video signal portion read out from the same address always delays a certain fixed period of time from the vertical synchronizing signal. herefore, with the continuity of the vertical synchronizing signal secured by this embodiment, the reproduced picture can be completely prevented from having vertical sways.

Figure 9:
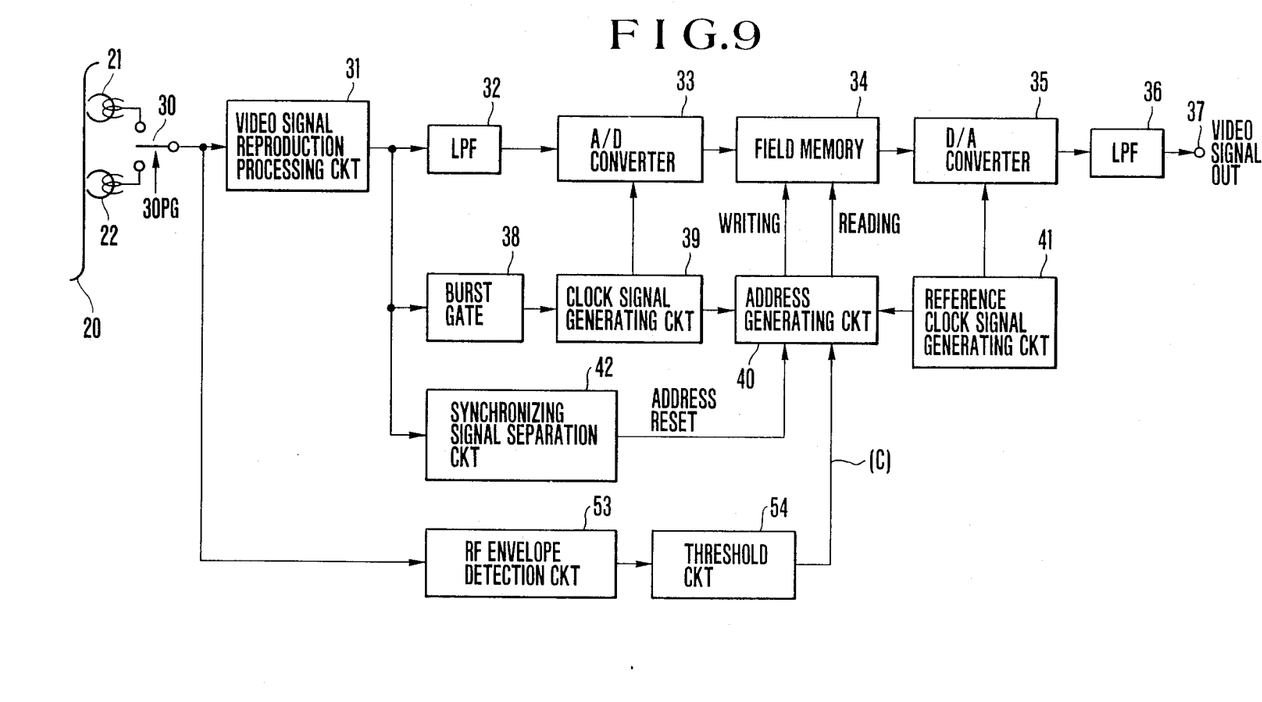
FIG. 9 is a block diagram showing the essential parts of a VTR arranged as another embodiment of this invention.

FIG. 9 shows in a block diagram the essential parts of a VTR arranged as another embodiment of this invention. In FIG. 9, the components of the VTR similar to those of the VTR of FIG. 7 are indicated by the same reference numerals and the details of them are omitted from the following description: An RF envelope detection circuit 53 is arranged to envelope detect an RF signal produced from a switch 30. A threshold circuit 54 is arranged to detect that the output level of the detection circuit 53 exceeds a predetermined level. Unlike the preceding example of embodiment shown in FIG. 7, this embodiment is arranged to give a rewriting instruction signal by setting a threshold value at a certain level of the output of the RF envelope detection circuit 53 after completion of detection performed by the circuit 53.

Like in the case of the VTR of FIG. 7, the field memory is rewritten only with a video signal portion where a sufficient reproduction output is obtained, so that a reproduced picture can be obtained in an adequate state. Besides, since the writing address is arranged to be reset by the reproduced vertical synchronizing signal, the reproduced picture can be completely prevented from having any vertical sways.

Figure 10:
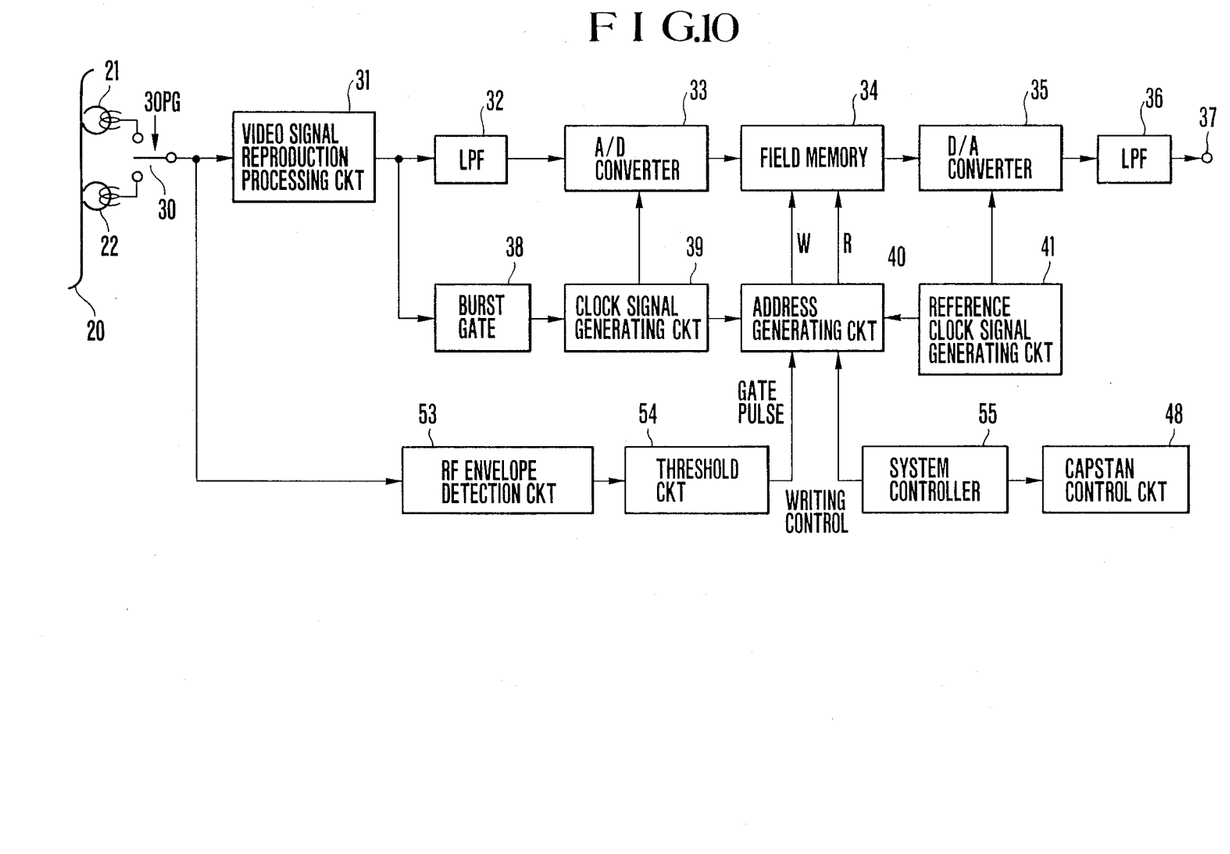
FIG. 10 is a block diagram showing the essential parts of a VTR arranged as a further example of embodiment of this invention.
Figure 11A:
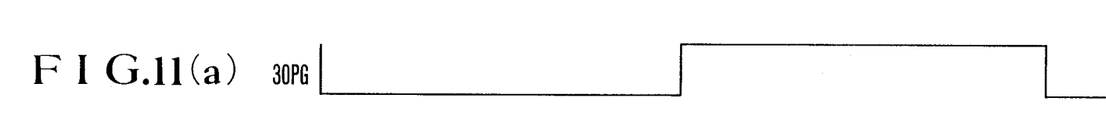
FIGS. 11() to 11(c) show in a timing chart the operations of various parts of the VTR shown in FIG. 10.
Figure 11B:
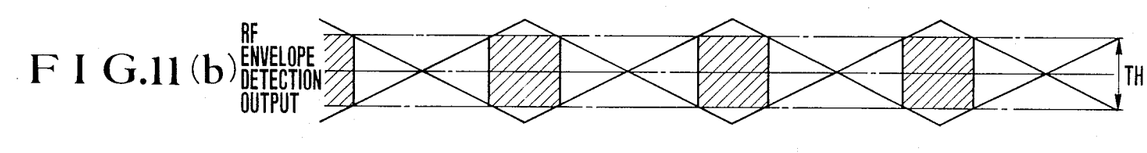
Figure 11C:
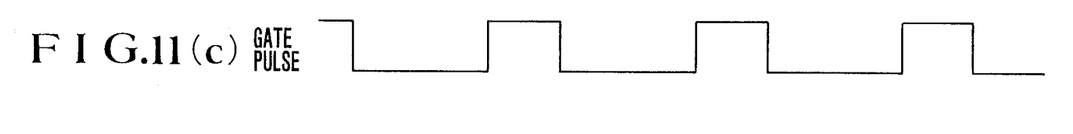
Figure 12:
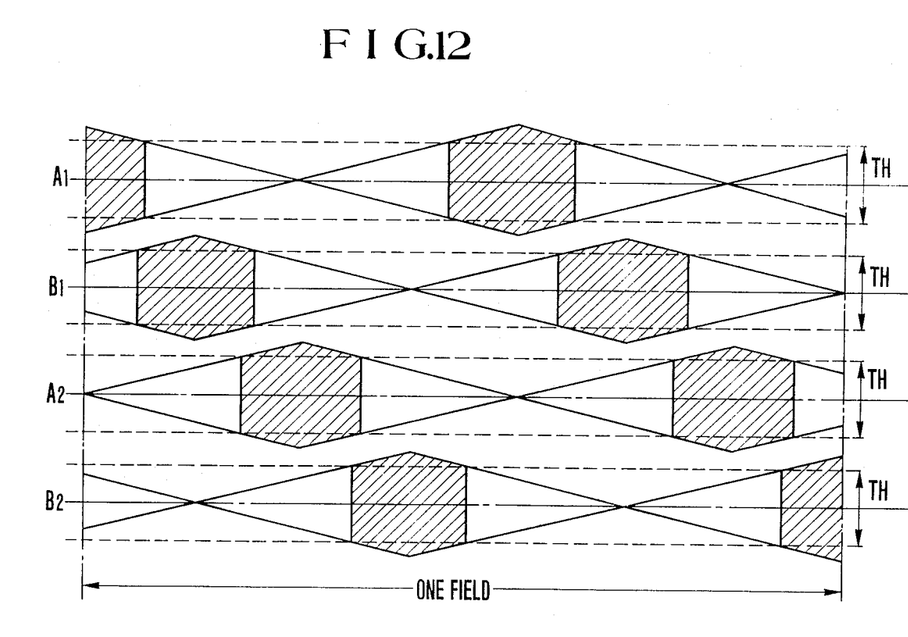
FIG. 12 is a timing chart showing the operations of various parts of FIG. 10.

FIG. 10 shows the essential parts of a VTR which is arranged as a further embodiment of this invention. In FIG. 10, all the components that are similar to those of FIG. 9 are indicated by the same reference numerals and their details are omitted from the following description: The embodiment is provided with a system controller 55. Upon receipt of an instruction for a high speed search or look-up operation, the system controller 55 causes a capstan control circuit 48 to have a magnetic tape which is not shown allowed to travel at a speed ½(2m+1) times as high as the tape speed employed in recording. FIGS. 11(a) to 11(c) show the 30 PG signal, the RF envelop detection output and gate pulses from a threshold circuit 54 of the VTR of FIG. 10. FIG. 12 shows the data renewing operation of the same VTR performed on its field memory during a search reproducing operation at a tape speed about ½(2m+1) times as high as the tape speed employed in recording. In the case of FIG. 12, the tape speed is determined, by way of example, with "m" set at 4. In FIG. 12, parts Ai and Bi show the envelope wave form of one field portion of the signal reproduced when the tape is traced once by two heads A and B, which are arranged to have different azimuth angles.

The hatched parts of FIG. 12 represent data of the reproduced signal portions to be renewed at the field memory. In the case of the VTR which performs azimuth overlapped writing, the whole data of the field memory can be renewed within the period of four fields, that is, by tracing the tape four times.

While, in the case of this embodiment, the invention is applied to a VTR of the two-head helical scanning type performing azimuth overlapped writing, the concept of this embodiment is applicable to VTRs of different head arrangements irrespectively of the presence or absence of the azimuth angle. More specifically, in the case of a VTR which does not perform azimuth recording and is arranged to give a guard band, the threshold circuit 54 is arranged to have the threshold value set at a lower level. By this, the whole data of the field memory can be renewed by tracing the tape two times (for two fields) and thus high speed search reproduction can be adequately performed.

The embodiment described is capable of always periodically storing an adequately reproduced signal obtained from the whole picture. Therefore, the embodiment gives an adequate picture even in the case of a high speed search reproducing operation.

Figure 13:
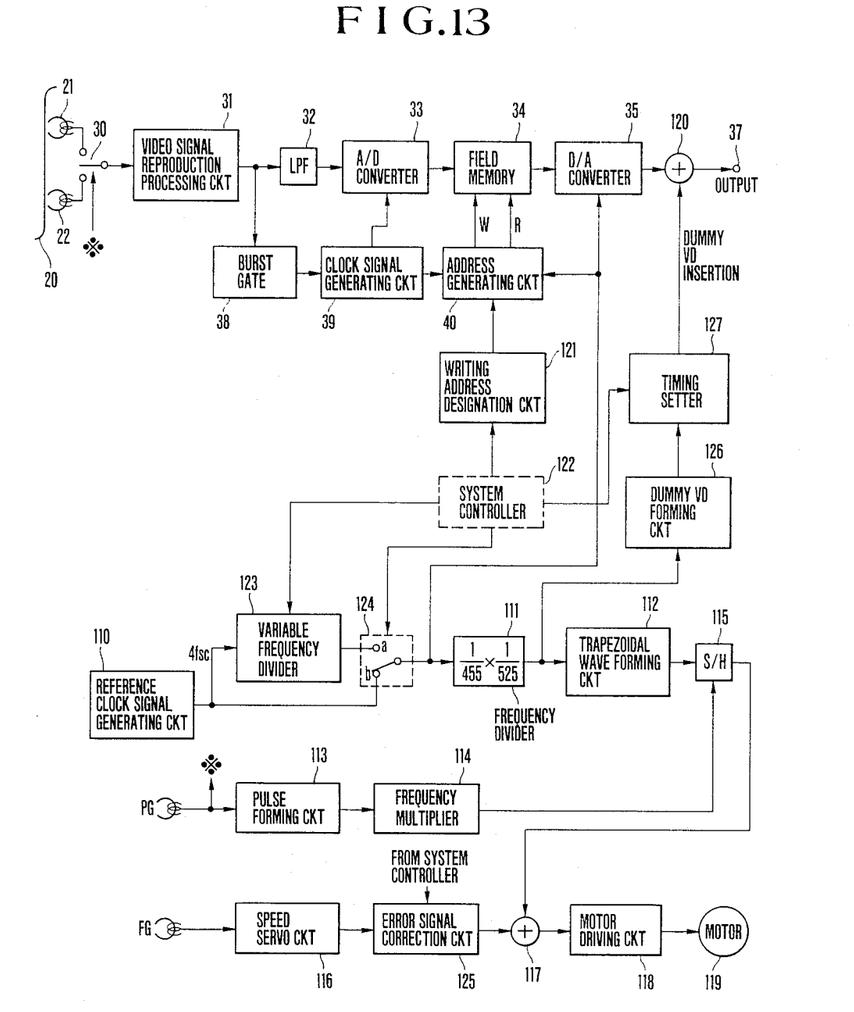
FIG. 13 is a block diagram showing the essential parts of a VTR arranged as a further example of embodiment of this invention.

FIG. 13 shows the essential parts of a VTR arranged as another embodiment of this invention. In FIG. 13, the components similar to those of the preceding example of embodiment are indicated by the same reference numerals and their details are omitted form the following description: The embodiment comprises an adder 120; a writing address designation circuit 121; a system controller 122; a variable frequency divider 123; a switch 124; an error signal correction circuit 125; a dummy vertical synchronizing pulse forming circuit 126; and a timing setter 127.

Figure 14:
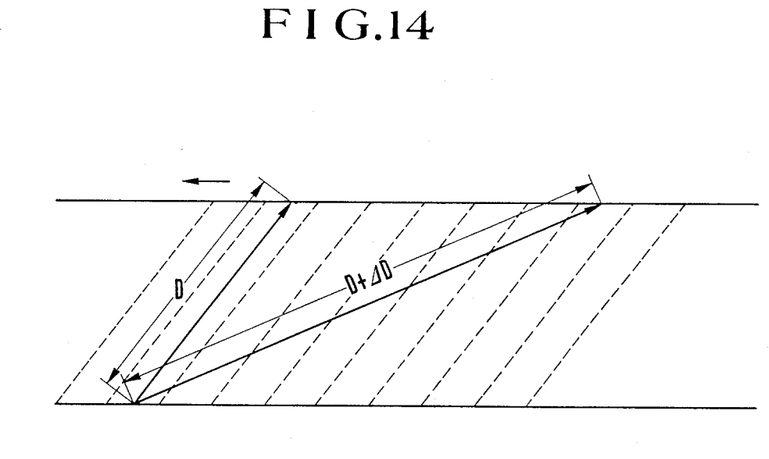
FIG. 14 is an illustration of the tracing loci of the reproducing head of the VTR obtained during normal reproduction and high speed reproduction.

FIG. 14 shows the tape tracing loci of the head of the VTR obtained during an ordinary reproducing operation and a high speed search reproducing operation.

As obvious from FIG. 14, the tape tracing distance of the rotary head, that is, the passing distance of the tape while one field portion of the video signal is reproduced by the head varies according as the VTR is in the ordinary reproduction mode or in the high speed search reproduction mode. Assuming that the tape passing distances during one tracing process of the rotary head in the ordinary reproduction mode and in the high speed search reproduction mode are D and $D+\Delta D$ respectively and that one field period (1/60 sec) is T, the relative speeds between the head and the tape obtained when the rotary head is caused to make 60 turns per sec in the ordinary reproduction mode and in the high speed search reproduction mode can be expressed as $D/T$ and $D+\Delta D/T$ respectively. In order to have the same relative speed between the tap and the head in the high speed search reproduction mode as in the ordinary reproduction mode, one field period T' of the high speed search reproduction mode must be set at $T'=(D+\Delta D/D) \times T$ thus to make it $D+\Delta D/D$ times as long as one field period of the ordinary reproduction mode. In other words, the rotating speed of the head in the high speed search reproduction mode must be arranged to be $D/(D+\Delta D)$ times as high as the speed obtained in the ordinary reproduction mode.

The ordinary reproducing operation of the VTR of this embodiment is obvious from the foregoing description given with reference to FIGS. 4 and 5. In the high speed search reproduction mode, the VTR operates as follows: In response to an operation on an operation part which is not shown, the system controller 122 produces instruction data for setting the tape moving speed at a speed n (n>1) times as high as a tape speed employed in ordinary reproduction. Then, at a speed servo system provided for a drum motor 119, a speed error signal is corrected by the error signal correction circuit 125. The servo system is thus arranged such that there obtains a control drawing effect when the rotating speed of the drum becomes somewhat lower. Meanwhile, in the phase servo system of the drum motor 119, the connecting position of a switch 124 is changed from its terminal b which is for normal reproduction over to its another terminal a. A reference clock pulse signal which is generated at a frequency 4 fsc by a reference clock signal generator 110 is supplied to a variable frequency divider 123 which is composed of a PLL, etc. Then, the frequency of the reference clock pulse signal is changed in proportion to the rotating speed of the drum motor 119. More specifically, the frequency dividing ratio of this frequency divider 123 is arranged to be changed from one ratio over to another according to the tape moving speed determined in response to the instruction of the system controller 122. The output of the frequency divider is supplied via the terminal a of the switch 124 to another frequency divider 111. Then, is the same manner as in the case of FIG. 5 described in the foregoing, a phase error signal is formed through a trapezoidal wave forming circuit 112 and an S/H circuit 115. The phase error signal is supplied to an adder 117 to be added to the speed error signal which has been corrected. The output of the adder 117 is supplied to a motor driving circuit 118. Then, the rotation of the drum motor 119 is controlled in accordance with this in such a way as to make the relative speed between the tape and the head coincide with their relative speed obtained during ordinary reproduction.

The writing address designation circuit 121 is arranged to determine data for a writing address to be generated by an address generating circuit 40 in such a manner that only a portion of the video signal reproduced at the timing which gives an adequately high reproduction level and is determined by the tape moving speed and the phase at which the rotary head arrives at an applicable track is written in the field memory 34. An adequate video signal portion corresponding to the whole picture plane can be reproduced within the period of two fields if the tape moving speed is set at a speed 2i (i: an integer) times as high as the tape moving speed employed in recording; and within the period of four fields if the tape moving speed is set at a speed (j+½) times as high as the recording tape moving speed (j: an integer).

The clock pulse signal coming via the switch 124 is not only supplied to the frequency divider 111 but also to the D/A converter 35 and the address generating circuit 40 to drive them. In other words, the clock pulses obtained by frequency dividing the reference clock pulses according to the rotating speed of the rotary head are supplied to have digital-to-analog conversion and reading from the field memory 34 performed according thereto.

The output of the frequency divider 111 of the phase serve system is supplied to a trapezoidal wave forming circuit 112 and also to a dummy vertical synchronizing pulse forming circuit 126. The circuit 126 produces dummy vertical synchronizing pulses. The pulses from the circuit 126 are then supplied to an adder 120 at a timing set by a timing setter 127 in accordance with the instruction of the system controller 122 and are inserted into a video signal produced from a D/A converter 35.

In the case of this VTR, the frequency of the color burst signal separated by a burst gate 38 during a high speed search reproducing operation becomes different from the frequency obtained in the ordinary reproduction mode. However, since the clock signal produced from the switch 124 is at a frequency corresponding to the rotation speed of the rotary head, one field portion of the video signal can be read out always within each tape tracing period of the rotary head. Therefore, the timing of the signal reproduced by the rotary head and that of the signal read out from the field memory 34 always coincide with each other. Further, since the dummy vertical synchronizing pulses are formed on the basis of this clock signal, the dummy vertical synchronizing pulses are perfectly in synchronism with the video signal read out from the field memory 34.

As described above, the embodiment is capable of having the relative speed of the rotary head and the tape-shaped record bearing medium unvaried irrespectively of the travelling speed of the tape-shaped record bearing medium; and is also capable of reading, from the memory which can store one field portion of the video signal, the video signal always at a timing which coincides with the timing of the video signal reproduction by the rotary head. The embodiment is, therefore, capable of producing an excellently reproduced video signal.

What is claimed is:

1. An apparatus for reproducing a video signal from a record bearing medium on which many recording tracks are formed in parallel with each other with a predetermined period portion of said video signal recorded in each of said tracks, comprising:
    (a) a reproducing head arranged to trace the surface of said record bearing medium;
    (b) memory means which is arranged to receive said video signal reproduced by said reproduced head and to be capable of storing said predetermined period portion of the video signal;
    (c) tracking error signal generating means for generating a tracking error signal a level of which indicates a dimension and a direction of the positional error of said reproducing head relative to one of said recording tracks on the basis of signals reproduced by said reproduced head;
    (d) tracking control means for controlling a relative position between said head and said record bearing medium on the basis of said tracking error signal;
    (e) detection means for detecting whether the level of said tracking error signal is less than a first level and more than a second level which is higher than the first level to produce a bi-state signal; and
    (f) writing control means for determining, according to said bi-state signal, whether or not said video signal reproduced by said reproducing head is to be written into said memory means.

2. An apparatus according to claim 1, wherein said detection means includes, a first comparison circuit arranged to compare the level of said tracking error signal to the first level and to produce a first bi-state signal, a second comparison circuit arranged to compare the level of said tracking error signal to the second level and to produce a second bi-state signal, and a logic circuit arranged to receive said first and second bi-state signals and to supply a third bi-state signal to said writing control means.

3. An apparatus according to claim 1, further comprising moving means for moving the record bearing medium in a direction crossing said tracks, and wherein said tracking control means controls a moving speed of the record bearing medium moved by said moving means.

4. An apparatus according to claim 1, further comprising:
 clock signal generating means for generating a clock signal at a frequency according to a data writing cycle in which data is written into said memory means; and
 address control means which includes a counter for counting the clock pulses of said clock signal and controls the writing address of said memory means.

5. An apparatus to claim 4, wherein the predetermined period of said predetermined period portion of the video signal is determined in relation to the vertical scanning period of the apparatus; and said address control means is arranged to reset said counter by means of a vertical synchronizing signal included in the video signal reproduced by said reproducing head.

6. An apparatus according to claim 1, wherein four different kinds of pilot signals having different frequency values are recorded in said many tracks, one in each of said tracks, in predetermined rotation.

7. An apparatus according to claim 1, wherein said record bearing medium is a magnetic tape, and said reproducing head is a rotary head.

8. A video signal reproducing apparatus for reproducing a video signal from a tape-shaped record bearing medium on which a predetermined period portion of said video signal is recorded together with a pilot signal in each of many oblique recording tracks formed in parallel, comprising:
 (a) a rotary head which is arranged to repeatedly trace on said tape-shaped record bearing medium;
 (b) memory which is arranged to receive said video signal reproduced by said rotary head and to be capable of storing said predetermined period portion of the video signal;
 (c) tracking error signal generating circuit for generating a tracking error signal which indicates a dimension and a direction of the positional error or said reproducing head relative to said track on the basis of said pilot signal reproduced by said rotary head;
 (d) capstan for transporting the tape-shaped record bearing medium in a longitudinal direction of said medium;
 (e) capstan driving circuit for driving said capstan, the driving circuit being controlled by said tracking error signal;
 (f) bi-state signal generating circuit for generating bi-state signal according to the level of said tracking error signal; and
 (g) writing control circuit for determining, according to said bi-state signal, whether or not said video signal reproduced by said rotary head is to be written into said memory.

9. An apparatus according to claim 8, wherein said bi-state signal generating circuit includes a detection circuit arranged to detect whether the level of said tracking error signal is less than a first level and more than a second level which is higher than the first level.

* * * * *